United States Patent [19]

Gallagher et al.

[11] Patent Number: 4,680,373

[45] Date of Patent: Jul. 14, 1987

[54] PROCESS FOR THE PRODUCTION OF A RANDOM COPOLYMER CONTAINING REPEATING POLYIMIDE UNITS AND REPEATING POLYETHERIMIDE UNITS

[75] Inventors: Patrick E. Gallagher, Pittsfield; Ronald A. Greenberg, Lenox, both of Mass.

[73] Assignee: General Electric Company, Pittsfield, Mass.

[21] Appl. No.: 867,635

[22] Filed: May 27, 1986

Related U.S. Application Data

[63] Continuation of Ser. No. 687,867, Dec. 31, 1984, abandoned.

[51] Int. Cl.$^4$ .............................................. C08G 73/10
[52] U.S. Cl. ..................... 528/185; 526/65; 526/66; 528/125; 528/126; 528/128; 528/173; 528/179; 528/183; 528/188; 528/351; 528/352; 528/353

[58] Field of Search ................... 526/65, 66; 528/125, 528/126, 128, 173, 179, 183, 185, 188, 351, 352, 353

[56] References Cited

U.S. PATENT DOCUMENTS

| | | | |
|---|---|---|---|
| 3,803,085 | 4/1974 | Takekoshi et al. | 528/26 |
| 3,833,546 | 9/1974 | Takekoshi et al. | 528/188 |
| 3,847,867 | 11/1974 | Heath et al. | 528/26 |
| 3,875,115 | 4/1975 | Heath et al. | 528/392 |
| 3,968,083 | 7/1976 | Quinn | 528/208 |
| 3,983,093 | 9/1976 | Williams, III et al. | 528/185 |
| 4,421,907 | 12/1983 | Schmidt et al. | 526/65 |
| 4,443,591 | 4/1984 | Schmidt et al. | 526/65 |
| 4,443,592 | 4/1984 | Schmidt et al. | 526/65 |
| 4,504,650 | 3/1985 | Cooper | 528/185 |

*Primary Examiner*—Lucille M. Phynes
*Attorney, Agent, or Firm*—Bernard, Rothwell & Brown

[57] ABSTRACT

The present invention provides a process for the production of random copolymers containing repeating polyimide units and repeating polyetherimide units. The process is a reverse addition process and utilizes at least two dianhydrides of varying reactivity.

6 Claims, No Drawings

PROCESS FOR THE PRODUCTION OF A RANDOM COPOLYMER CONTAINING REPEATING POLYIMIDE UNITS AND REPEATING POLYETHERIMIDE UNITS

This is a continuation of application Ser. No. 687,867 filed Dec. 31, 1984 now abandoned.

BACKGROUND OF THE INVENTION

This invention relates to a novel process for the production of a random copolymer containing repeating polyimide units and repeating polyetherimide units. More particularly, the invention is concerned with making polyetherimides from two or more dianhydrides having different reactivities.

Polyetherimides having polyimide units and polyetherimide units are disclosed in U.S. Pat. No. 3,983,093. In the production of such polyetherimide copolymers, a plurality of dianhydrides of different reactivities are reacted with one or more diamines. Generally, staged reactions of the dianhydrides and the diamines are required to obtain a random rather than a block copolymer. In practice, this is accomplished by adding a solvent, dianhydride, diamine, chain stopper, and catalyst to a reactor and heating it to 120° C. or above to drive off the water from the condensation reaction. A second, more reactive dianhydride, is then added to this solution of oligomers. The reactor batch is then heated to complete the imidization reaction, after which it can be devolatized.

Unfortunately, due to the disparity in reactivities of the dianhydrides employed in making these copolymers, a number of process difficulties arise. Charging the second dianhydride at temperatures above 120° C., results in a rapid evolution of water. This evolution of water causes severe foaming, which can result in loss of starting material by overflow into the distillation system. These losses can be minimized by conducting the reaction with smaller batch sizes, which unfortunately limits the productivity of this process. A second process problem is that a high viscosity solution can result at the low temperatures at which the second dianhydride is added. For example, when 2,2-bis[4(2,3-dicarboxyphenoxy)phenyl]propane dianhydride is the first dianhydride and pyromellitic dianhydride is the second, viscosities above 500,000 cps can be encountered at 120° C. and when the pyromellitic dianhydride level is greater than 18 mole percent of the total dianhydrides. A third process problem is controlling the stoichiometry during the reaction. In condensation polymerizations of this type, stoichiometry is preferably controlled to within plus-or-minus 0.2%. In the staged reaction process, losses of the second dianhydride can occur as a result of entrainment of that solid reactant in the solids charging system. Additionally, water, which is generated upon addition of the dianhydride, can react with remaining dianhydride, forming the diacid or tetraacid which may not fully react with the amine end-groups of the oligomers.

Therefore, there exists a need for an efficient process for the production of a random copolymer containing repeating polyimide units and repeating polyetherimide units which overcomes the problems discussed above.

SUMMARY OF THE INVENTION

In accordance with the present invention, a process is provided for the production of a substantially random copolymer containing repeating polyimide units and repeating polyetherimide units comprising (a) reacting in a first reactor at least one dianhydride of the formula

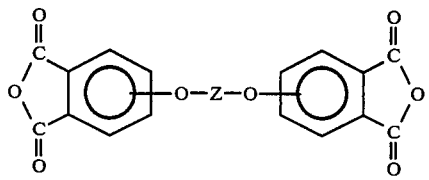

with a diamine compound of the formula $$H_2N-R-NH_2 \qquad II$$

under imidization conditions for a time sufficient to produce amine-terminated oligomers; (b) heating in a second reactor at least one dianhydride of the formula

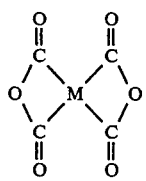

and an inert solvent to a temperature equal to or greater than the first reactor; and (c) metering the contents of the first reactor into the contents of the second reactor and heating the resulting mixture for a time sufficient to complete the imidization reaction; wherein —O—Z—O— is in the 3 or 3'- and 4 or 4'-positions and Z is a member of the class consisting of (1)

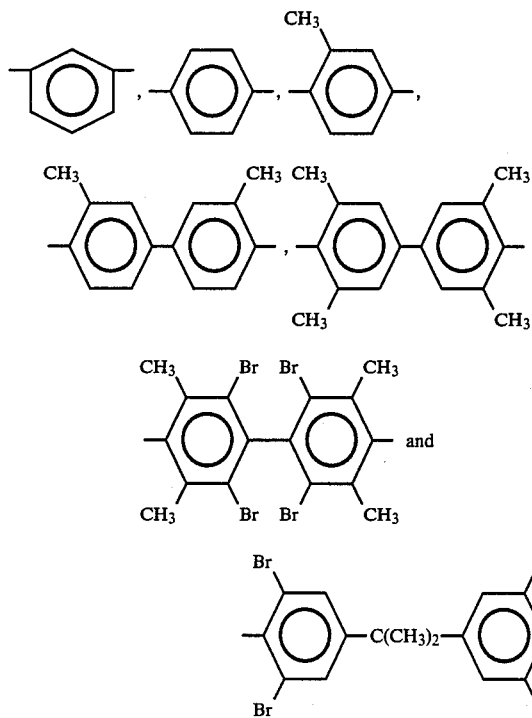

and (2) divalent organic radicals of the general formula:

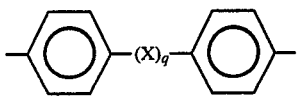

where X is a member selected from the class consisting of divalent radicals of the formulas, $-C_yH_{2y}-$,

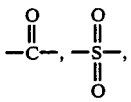

—O— and —S— where q is 0 or 1, y is a whole number from 1 to about 5, R is a divalent organic radical selected from the class consisting of (a) aromatic hydrocarbon radicals having from 6 to about 20 carbon atoms and halogenated derivatives thereof, (b) alkylene radicals and cycloalkylene radicals having from 2 to about 20 carbon atoms, $C_{(2-8)}$ alkylene terminated polydiorganosiloxane, and (c) divalent radicals included by the formula

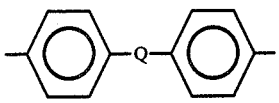

where Q is a member selected from the class consisting of —O—,

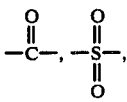

—S—, and $-C_xH_{2x}-$, and x is a whole number from 1 to about 5 inclusive, and M is a tetravalent radical selected from the group consisting of

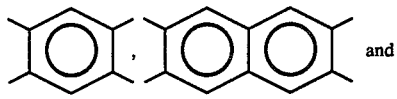 and

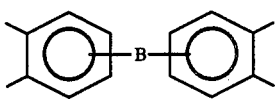

where B is an electron-withdrawing group.

DETAILED DESCRIPTION OF THE INVENTION

The present invention provides a process for the production of substantially random copolymers containing repeating polyimide units and repeating polyetherimide units. The present process is a reverse addition process and utilizes at least two dianhydrides of varying reactivity.

The first step of the process of the present invention involves reacting a dianhydride of Formula I with at least one organic diamine of the Formula II under imidization conditions to form a solution of amine terminated oligomers having a viscosity below about 500,000 centipoise.

Examples of various dianhydrides of Formula I include, for example:

1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride;
1,4-bis(3,4-dicarboxyphenoxy)benzene dianhydride;
2,2-bis[4-(3,4-dicarboxyphenoxy)phenyl]propane dianhydride (hereinafter referred to as BPADA);
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride;
4-(2,3-dicarboxyphenoxy)-4'-(3,4-dicarboxyphenoxy)-diphenyl-2,2-propane dianhydride and mixtures thereof.

Some of the aromatic bis(ether anhydride)s of Formula I are shown in U.S. Pat. No. 3,972,902 (Darrell Heath and Joseph Wirth). As described therein, the bis(ether anhydride)s can be prepared by the hydrolysis, followed by dehydration, of the reaction product of a nitrosubstituted phenyl dinitrile with a metal salt of a dihydric phenol compound in the presence of a dipolar, aprotic solvent.

Additional aromatic bis(ether anhydride)s also included by Formula I are shown by Koton, M. M., Florinski, F. S.; Bessonov, M. I.; Rudakov, A. P. (Institute of Heteroorganic Compounds, Academy of Sciences, U.S.S.R.), U.S.S.R. 257,10, Nov. 11, 1969, Appl. May 3, 1967, and by M. M. Koton, F. S. Florinski, *Zh. Org. Khin*, 4(5), 774 (1968).

The organic diamines of Formula II include, for example:
m-phenylenediamine,
p-phenylenediamine,
4-4'-diaminodiphenylpropane,
4,4'-diaminodiphenylmethane (commonly named 4,4'-methylenedianiline),
4,4'-diaminodiphenyl sulfide,
4,4'-diaminodiphenyl sulfone,
4,4'-diaminodiphenyl, ether (commonly named 4,4'-oxydianiline),
1,5-diaminonaphthalene,
3,3'-dimethylbenzidine,
3,3'-dimethoxybenzidine,
2,4-bis(β-amino-t-butyl)toluene,
bis(p-β-amino-t-butylphenyl)ether,
bis(p-β-methyl-o-aminopentyl)benzene,
1,3-diamino-4-isopropylbenzene,
1,2-bis(3-aminopropoxy)ethane,
benzidine,
m-xylylenediamine,
p-xylylenediamine, 2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine
nonamethylenediamine,
decamethylenediamine,
bis(3-aminopropyl)tetramethyldisiloxane,
bis(4-aminobutyl)tetramethyldisiloxane,
and mixtures of such diamines.

In order to produce some amine terminated oligomers a molar excess of diamine relative to dianhydride is employed. The overall process of the present invention may use from 0.5 to 2.0 mole of organic diamine per mole of dianhydride, with the preferred range being from about 0.9 to 1.1 mole of organic diamine per mole of dianhydride. While these ranges are for the overall process of the present invention, generally from about 78 to 99 mole percent, preferably 80- to 84 mole percent of the total dianhydride is reacted in the first stage.

The imidization conditions employed in the first reaction step generally include the use of a high-boiling, substantially inert reaction solvent. Such solvents include inert nonpolar organic solvents and inert polar solvents that do not deleteriously affect the reaction. Examples of nonpolar solvents are ethylbenzene, propylbenzene, chlorobenzene, dichlorobenzenes, trichlorobenzenes, biphenyl, terphenyl, diphenylether, diphenyl sulfide, acetophenone, chlorinated biphenyl, chlorinated diphenylethers, dichloroethane, tetrachloroethane, trichloroethylene, tetrachloroethylene, methylcyclohexane, octane, isooctane, decane, and the like.

Polar reaction solvents that can be used include phenolic solvents, such as phenols, cresols, ethylphenols, isopropylphenols, t-butylphenols, xylenols, chlorophenols, dichlorophenols, phenylphenols, and the like. In addition, dipolar, aprotic solvents can be employed as reaction solvents. Such solvents are generally non-acid, oxygen-containing, nitrogen-containing, organic solvents and include, for example, N,N-dimethylacetamide, N-methylpyrrolidone, N,N-dimethylformamide, dimethylsulfoxide, hexamethylphosphoramide, and the like.

Mixtures of such solvents can also be employed. A particularly preferred solvent is o-dichlorobenzene.

The imidization conditions of the first reaction step further include a reaction temperature high enough to provide a solution of an amine-terminated oligomer with a viscosity below about 500,000 centipoise. Generally, the reaction temperature of this first stage is from about 150° C. to about 180° C., preferably about 160° C. to about 170° C.

Any order of addition of reactants in the first step may be employed. It is preferred to effect reaction of the dianhydride and the organic diamine in an inert atmosphere, such as nitrogen or helium. Sufficient solvent is generally utilized to provide a solids content in the range of between 1% and 90%, preferably in the range between about 15% and about 60%.

Reaction time for the first process step can vary from about 0.5 to about 20 hours, depending upon such factors as the temperature employed, degree of agitation, nature of reactants, solvent, and the like. Various catalysts can be employed in catalytic amounts. Such catalysts include inorganic salts, such as alkali metal carbonates, sodium chlorate or ferric sulfate, and oxygenated phosphorous compounds of various alkali metals, such as sodium phenyl phosphonate.

The first step of the process of the present invention produces an amine-terminated oligomer mixture. As used herein, the term "amine-terminated oligomer mixture" means a material which generally contains a substantial amount of partially reacted oligomers having terminal amine groups, but also typically contains polyetherimide and polyacid amide intermediate compounds.

In the second step of the process, a dianhydride of Formula III is heated in a second reactor in a solvent such as that employed in the first reaction step. The dianhydride-solvent mixture is advantageously heated to a temperature substantially equal to that of the first reaction.

The dianhydrides of Formula III are thought to be more reactive than those of Formula I, because of the destabilizing effects of the electron-withdrawing aromatic ring systems on the carbonyl groups. In contrast, the electron-donating ether groups in the dianhydrides of Formula I tend to stabilize the carbonyl groups and make those compounds relatively less reactive. Various electron-withdrawing groups may be employed as the substituent designated "B" in the dianhydrides of Formula III. Preferred groups for substitutuent B are

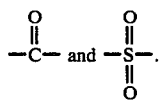

The concentration of the dianhydride of Formula III in the solvent in the second reactor may vary over a fairly wide range. Such dianhydrides are typically insoluble or only slightly soluble, therefore, the mixture may occur as a slurry rather than a true solution. The concentration of the dianhydride is advantageously high enough to permit the use of reasonably sized vessels and the like, yet sufficiently low to provide homogeneous reactions and avoid high viscosities. Such concentrations generally range from about 20% solids to about 60% solids, preferably from about 35% solids to about 45% solids.

After the dianhydride of Formula IV has been heated to a suitable temperature, the amine-terminated oligomer mixture of the first reactor is metered into the dianhydride mixture of the second reactor. This metering is preferably accompanied by agitation and the maintenance of imidization conditions. The rate of addition of the oligomers is controlled such that water can be removed from the reaction mixture as it is formed. The actual rate of addition can vary depending upon the particular reactants, the size of the reaction vessel and the conditions employed.

The amount of water generated, as a percentage of theoretical, can be used to monitor the course of the imidization reaction. Water can be removed on a continuous basis by azeotropic distillation, employing a low-boiling azeotropic solvent.

During this third step, after the two reaction mixtures have been completely combined, the reactants are further heated for a time sufficient to complete the imidization reaction. Generally after the two mixtures are combined, the reaction mixture is heated to a temperature suitable to complete the polymerization, but less than 450° C. to form a substantially random copolymer. Preferred temperatures for this step range from about 250° C. to about 350° C. In this final process step, substantially complete polymerization and solvent and water removal occur.

The present process overcomes the disadvantages of reacting in one step, all of the dianhydride with the diamine. The severe foaming which can result in a loss of material in the distillation system is avoided. In addition, the high viscosity solution resulting from the low temperatures employed in the prior art are avoided, while excellent stoichiometric control is achieved.

The invention is further illustrated by the following examples, which is not intended to be limiting.

EXAMPLE 1

To a 3 liter, jacketed (hot oil) reactor were charged 2,2-bis[4-(3,4-dicarboxyphenoxy)pheyl]propane dianhydride (500 g), m-phenylenediamine (127.1 g), phthalic anhydride (3.26 g), 150 ppm catalyst, and 945 g of o-dichlorobenzene. The temperature of the reactor was slowly raised to 160° C. In a separate 2 liter reactor, pyromellitic dianhydride (50 g) and o-dichlorobenzene (o-DCB) (100 g) were heated to 160° C. The reactants from the first reactor were then transferred to the 2 liter reactor over a period of 1 hour followed by a flush of o-DCB (200 g). Two such batches were combined and transferred to a vacuum distillation apparatus for devolatilization at 290° C. at a pressure of 25 mm Hg for 3 hours. The resulting copolymer had an intrinsic viscosity of 0.64 dl/g in 60:40 phenol:1,1,1-trichloroethane, a glass transition temperature of 233° C., a flexural modulus (200° C., ⅛" bar) of 352,724 psi, and a flexural strength (200° C., ⅛" bar) of 9429 psi.

EXAMPLE 2

To a 3 liter, jacketed (hot oil) reactor were charged 2,2-bis[4-(3,4-dicarboxyphenoxy)phenyl]propane dianhydride (500 g), m-phenylenediamine (129.95 g), phthalic anhydride (9.96 g), 150 ppm catalyst, and 640 g of o-dichlorobenzene. The temperature of the reactor was raised slowly to 160° C. In a separate 2 liter reactor, pyromellitic dianhydride (46.1 g) and o-dichlorobenzene (713 g) were heated to 160° C. The contents of the first reactor were transferred to the 2 liter reactor over a period of 1 hour followed by a 200 g flush of o-DCB. The material was transferred to a devolatilizer and was heated to 320° C. and 25 mm Hg for 2 hours. The resulting copolymer had an intrinsic viscosity of 0.60 dl/g in 60:40 phenol:1,1,1-trichloroethane.

EXAMPLE 3

To a 3 liter, jacketed (hot oil) reactor were charged 2,2-bis[4-(3,4-dicarboxyphenoxy)phenyl]propane dianhydride (500 g), m-phenylenediamine (124.0 g), phthalic anhydride (3.0 g), 150 ppm catalyst, and 940 g of o-dichlorobenzene. The temperature of the reactor was raised slowly to 160° C. In a separate 2 liter reactor, pyromellitic dianhydride (43.9 g) and o-dichlorobenzene (200 g) were heated to 165° C. The contents of the first reactor were transferred to the 2 liter reactor over a period of 1 hour followed by a 243 g flush of o-DCB. The material was transferred to a devolatilizer and was heated to 320° C. and 25 mm Hg for 2 hours. The resulting copolymer had an intrinsic viscosity of 0.68 dl/g in 60:40 phenol:1,1,1-trichloroethane.

While the present invention has been described with reference to particular embodiments thereof, it will be understood that numerous modifications may be made by those skilled in the art without actually departing from the scope of the invention as defined in the appended claims.

What is claimed is:

1. A process for the production of a substantially random copolymer containing repeating polyimide units and repeating polyetherimide units comprising:
   (a) reacting in a first reactor at least one dianhydride of the formula

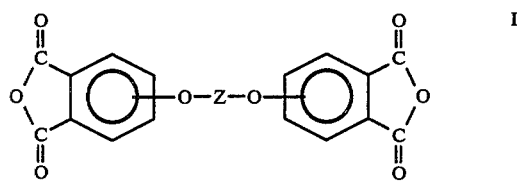

with a diamine of the formula

under imidization conditions for a time sufficient to produce amine-terminated oligomers;
   (b) heating in a second reactor at least one dianhydride of the formula

and an inert solvent to a temperature equal to or greater than the first reactor; and
   (c) metering the contents of the first reactor into the contents of the second reactor at a rate of addition such that water can be removed from the reaction mixture as it is formed and heating the resulting mixture for a time sufficient to complete the imidization reaction, wherein the molar ratio of total dianhydride reacted to total diamine reacted is 1:0.5 to 1:2 and from about 78 to 99 mole percent of the total dianhydride is reacted in step (a) and wherein —O—Z—O— is in the 3 or 3'- and 4 or 4'-positions and Z is a member of the class consisting of (1)

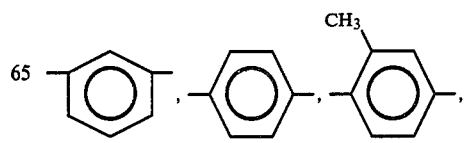

-continued

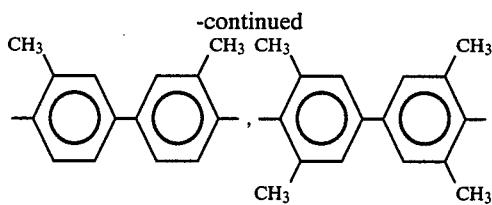

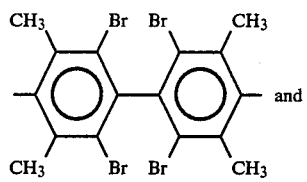

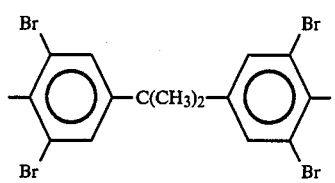

and (2) divalent organic radicals of the general formula:

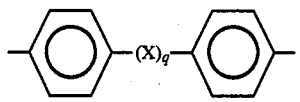

where X is a member selected from the class consisting of divalent radicals of the formulas, $-C_yH_{2y}-$,

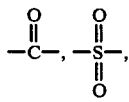

—O— and —S— where q is 0 or 1, y is a whole number from 1 to 5, R is a divalent organic radical selected from the class consisting of (a) aromatic hydrocarbon radicals having from 6 to about 20 carbon atoms and halogenated derivatives thereof, (b) alkylene radicals and cycloalkylene radicals having from 2 to about 20 carbon atoms, $C_{(2-8)}$ alkylene terminated polydiorganosiloxane, and (c) divalent radicals included by the formula

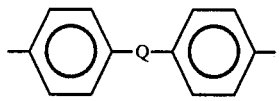

where Q is a member selected from the class consisting of —O—,

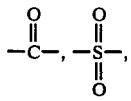

—S—, and $-C_xH_{2x}-$, and x is a whole number from 1 to 5 inclusive, and M is a tetravalent radical selected from the class consisting of

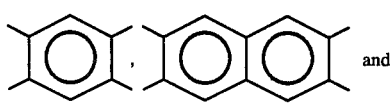

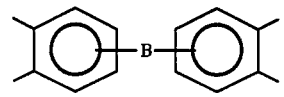

where B is an electron-withdrawing group.

2. The process of claim 1 wherein from 80 to 84 mole percent of the total dianhydrides are of the formula I.

3. The process of claim 1 wherein said dianhydride of the formula I is of the structure

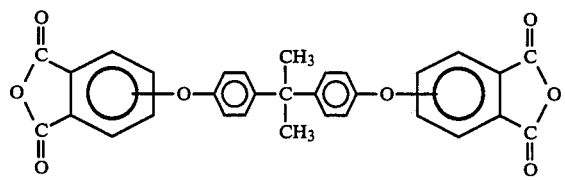

4. The process of claim 1 wherein the temperature of the first vessel is at least 160° C.

5. The process of claim 3, wherein the temperature of the second vessel is substantially the same as the first vessel.

6. The process of claim 1 wherein the solvent is o-dichlorobenzene.

* * * * *